United States Patent
Noda et al.

(10) Patent No.: US 10,858,066 B2
(45) Date of Patent: Dec. 8, 2020

(54) BICYCLE COMPONENT

(71) Applicant: Shimano Inc., Osaka (JP)

(72) Inventors: Shinichiro Noda, Osaka (JP); Takaaki Fujiwara, Osaka (JP)

(73) Assignee: Shimano Inc., Osaka (JP)

( * ) Notice: Subject to any disclaimer, the term of this patent is extended or adjusted under 35 U.S.C. 154(b) by 226 days.

(21) Appl. No.: 16/053,182

(22) Filed: Aug. 2, 2018

(65) Prior Publication Data

US 2019/0039688 A1 Feb. 7, 2019

(30) Foreign Application Priority Data

Aug. 4, 2017 (JP) .................................. 2017-151596

(51) Int. Cl.
| | |
|---|---|
| *B62M 6/60* | (2010.01) |
| *B62K 19/34* | (2006.01) |
| *B62M 6/90* | (2010.01) |
| *B62M 6/55* | (2010.01) |
| *B62M 17/00* | (2006.01) |
| *H02K 7/14* | (2006.01) |

(52) U.S. Cl.
CPC .............. *B62M 6/60* (2013.01); *B62K 19/34* (2013.01); *B62M 6/55* (2013.01); *B62M 6/90* (2013.01); *B62M 17/00* (2013.01); *H02K 7/14* (2013.01)

(58) Field of Classification Search
CPC ........... B62K 19/34; B62M 6/60; B62M 6/55; B62M 6/90; B62M 17/00
See application file for complete search history.

(56) References Cited

U.S. PATENT DOCUMENTS

| | | | | |
|---|---|---|---|---|
| 5,758,736 | A * | 6/1998 | Yamauchi | ................. B62M 6/45 180/220 |
| 5,845,727 | A * | 12/1998 | Miyazawa | ............... B62M 6/55 180/206.4 |
| 5,901,807 | A * | 5/1999 | Tseng | .................... B62M 11/145 180/206.3 |
| 5,967,537 | A * | 10/1999 | Chang | .................... B62M 17/00 280/259 |
| 6,230,586 | B1 * | 5/2001 | Chang | ...................... B62M 6/55 180/206.4 |
| 6,263,993 | B1 * | 7/2001 | Lin | ........................... B62M 6/55 180/206.4 |
| 6,394,477 | B1 * | 5/2002 | Cellini | ................... B62M 17/00 280/260 |

(Continued)

FOREIGN PATENT DOCUMENTS

| | | |
|---|---|---|
| CN | 202574542 U | 12/2012 |
| CN | 103963907 A | 8/2014 |

(Continued)

*Primary Examiner* — Ruth Ilan
*Assistant Examiner* — Michael R Stabley
(74) *Attorney, Agent, or Firm* — Global IP Counselors, LLP

(57) ABSTRACT

A bicycle component that can be reduced in size in a direction orthogonal to a crankshaft includes a housing and a first mounting portion. The housing includes a support that supports a crankshaft of a bicycle. The first mounting portion is provided on the housing independently from the support to mount the housing on a frame of the bicycle. The first mounting portion includes a through hole through which the crankshaft extends.

22 Claims, 13 Drawing Sheets

(56) References Cited

U.S. PATENT DOCUMENTS

| | | | |
|---|---|---|---|
| 6,516,908 B2 * | 2/2003 | Tseng | B62M 6/55 180/206.2 |
| 7,284,631 B2 * | 10/2007 | Rizzetto | B62M 6/55 180/206.4 |
| 8,678,417 B1 * | 3/2014 | Chang | B62M 6/90 264/258 |
| 9,120,532 B2 * | 9/2015 | Huang | B62K 19/30 |
| 9,227,695 B2 * | 1/2016 | Liu | B62M 6/55 |
| 9,315,231 B2 * | 4/2016 | Gingl | B62M 6/55 |
| 9,616,969 B2 * | 4/2017 | MacMartin | B60K 1/00 |
| 10,137,954 B2 * | 11/2018 | Hendey | B62J 1/08 |
| 10,137,960 B2 * | 11/2018 | Gibbings | B62M 3/003 |
| 2014/0084564 A1 | 3/2014 | Chang | |
| 2016/0303961 A1 | 10/2016 | Hendey et al. | |

FOREIGN PATENT DOCUMENTS

| | | |
|---|---|---|
| JP | 5-238461 A | 9/1993 |
| JP | 3007728 U | 11/1994 |
| JP | 2002-331983 A | 11/2002 |
| JP | 4416620 B2 | 12/2009 |

\* cited by examiner

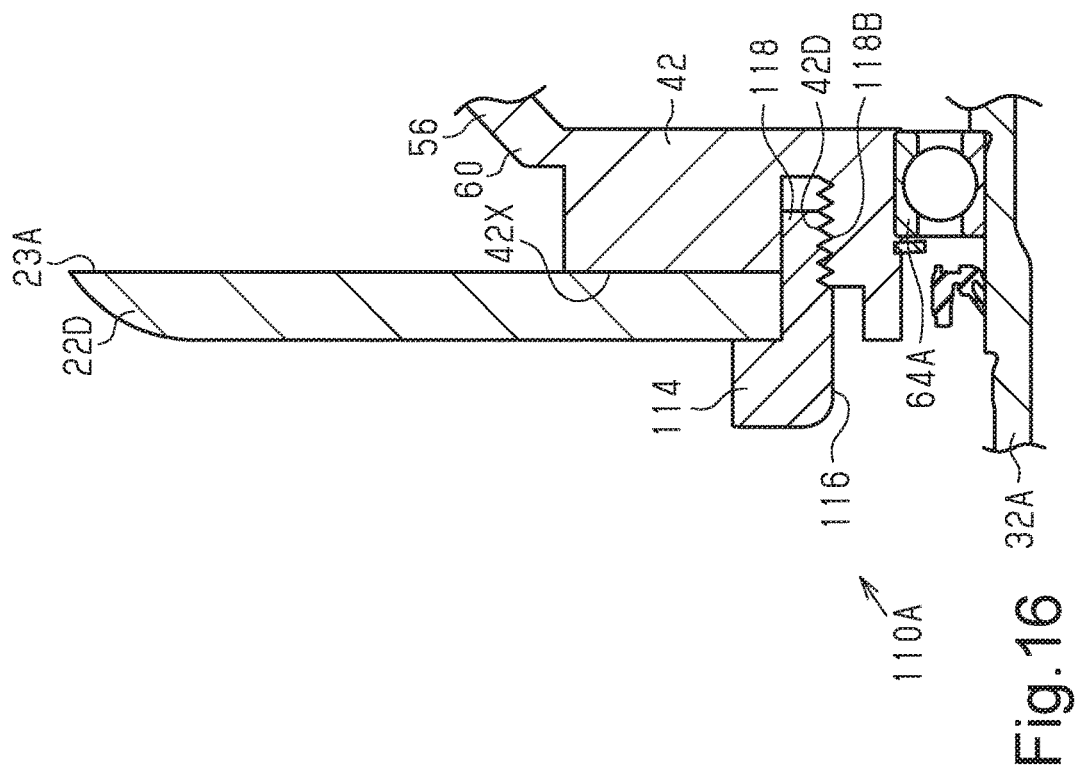
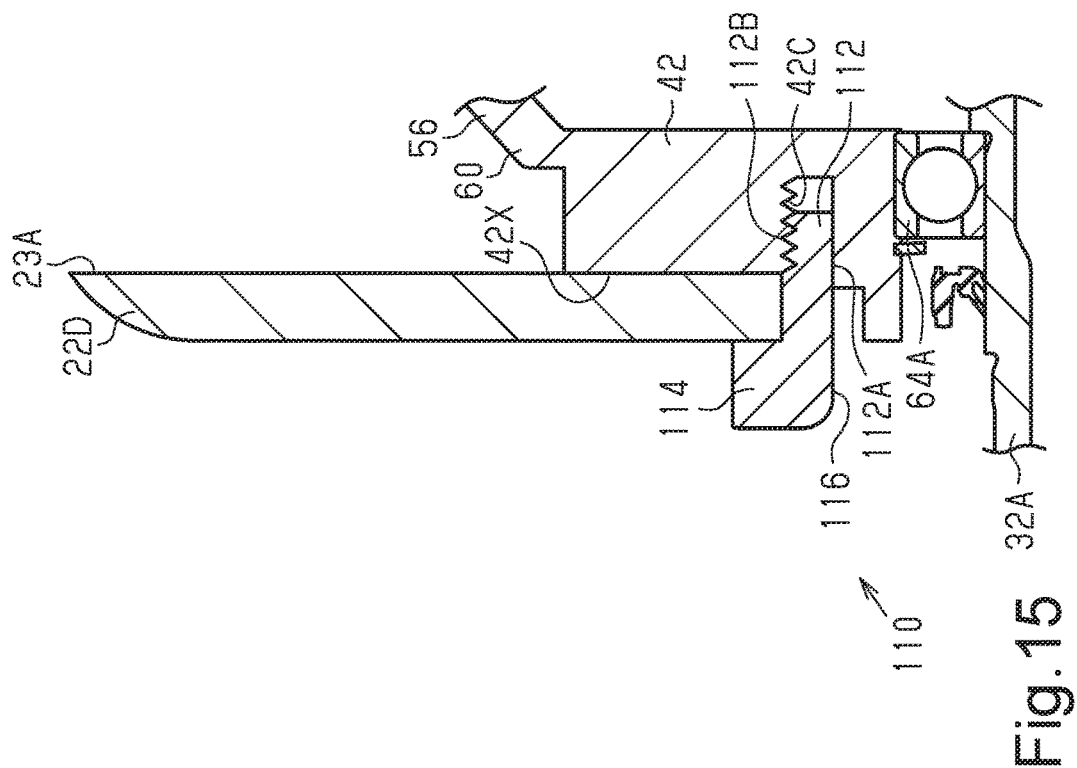

BICYCLE COMPONENT

CROSS-REFERENCE TO RELATED APPLICATIONS

This application claims priority to Japanese Patent Application No. 2017-151596, filed on, 2017, filed on Aug. 4, 2017. The entire disclosure of Japanese Patent Application No. 2017-151596 is hereby incorporated herein by reference.

BACKGROUND

Field of the Invention

The present invention generally relates to a bicycle component.

Background Information

A drive unit is a bicycle component that includes a motor that assists propulsion of a bicycle. One example of such a drive unit is disclosed in Japanese Patent No. 4416620 (hereinafter patent document 1), which describes a motor unit that mounts a bicycle component on a frame by fastening a bolt to a hole of a projection on an outer portion of a housing and to a hole of the frame.

SUMMARY

It is difficult to reduce the motor unit in size in a direction orthogonal to a widthwise direction of the bicycle because of the projection on the outer portion of the housing.

One object of the present disclosure is to provide a bicycle component that can be reduced in size in the direction orthogonal to the crankshaft.

A bicycle component in accordance with a first aspect of the present disclosure includes a housing and a first mounting portion. The housing includes a support that supports a crankshaft of a bicycle. The first mounting portion is provided on the housing independently from the support to mount the housing on a frame of the bicycle. The first mounting portion includes a through hole through which the crankshaft extends. In accordance with the first aspect, the bicycle component can be reduced in size in a direction orthogonal to the crankshaft.

In accordance with a second aspect of the present disclosure, in the bicycle component according to the first aspect, the first mounting portion is configured to apply force to the housing and the frame acting to move the housing and the frame away from each other in an axial direction of the crankshaft. In accordance with the second aspect, the bicycle component is stably mounted on the frame.

In accordance with a third aspect of the present disclosure, in the bicycle component according to the first or second aspect, the first mounting portion includes a first member and a second member. The first member includes a male thread and is configured to press the housing. The second member includes a female thread joined with the male thread of the first member and configured to press the frame. In accordance with the third aspect, the first and second member apply force in a preferred manner to move away the housing and the frame from each other.

In accordance with a fourth aspect of the present disclosure, in the bicycle component according to the third aspect, the first member is configured so that a first end surface in an axial direction of the crankshaft presses the housing. In accordance with the fourth aspect, the first end surface of the first member pushes the housing so that the first member applies force to the housing acting from the first member toward the housing.

In accordance with a fifth aspect of the present disclosure, in the bicycle component according to the third or fourth aspect, the first member is configured to support the housing in a direction intersecting an axial direction of the crankshaft. In accordance with the fifth aspect, the housing is supported by the first member in a preferred manner.

In accordance with a sixth aspect of the present disclosure, the bicycle component according to the fifth aspect is configured so that the first member includes the through hole, and the housing includes an insertion portion inserted into the through hole of the first member. In accordance with the sixth aspect, the insertion portion of the housing is inserted into the through hole of the first member to support the housing with the first member.

In accordance with a seventh aspect of the present disclosure, the bicycle component according any one of the third to sixth aspects is configured so that at least part of the second member is provided between the housing and the frame. In accordance with the seventh aspect, the second member stably couples the housing and the frame.

In accordance with an eighth aspect of the present disclosure, the bicycle component according any one of the third to seventh aspects is configured so that at least part of the second member is provided between the first member and the frame. In accordance with the eighth aspect, the second member stably couples the first member and the frame.

In accordance with a ninth aspect of the present disclosure, in the bicycle component according any one of the third to eighth aspects, the second member is configured to contact part of the frame in a direction intersecting an axial direction of the crankshaft. In accordance with the ninth aspect, the second member applies force in a preferred manner to the frame in a direction intersecting the axial direction of the crankshaft.

In accordance with a tenth aspect of the present disclosure, the bicycle component according any one of the third to ninth aspects is configured so that at least one of the first member or the second member, or both further includes a tool engagement portion that is engageable with a tool. In accordance with the tenth aspect, the bicycle component is easily mounted on the frame with a tool.

In accordance with an eleventh aspect of the present disclosure, the bicycle component according to the tenth aspect is configured so that the tool engagement portion is defined by at least one of an inner circumferential portion or an outer circumferential portion of the first member, or both. In accordance with the eleventh aspect, a tool can easily engage the tool engagement portion.

In accordance with a twelfth aspect of the present disclosure, in the bicycle component according to the first aspect, the first mounting portion is configured to sandwich the frame with the housing in an axial direction of the crankshaft. In accordance with the twelfth aspect, the first mounting portion stably mounts the bicycle component on the frame.

In accordance with a thirteenth aspect of the present disclosure, in the bicycle component according to the first or twelfth aspect, the first mounting portion includes a first part and a second part. The first part is configured to be joined with the housing. The second part extends outward in a radial direction of the crankshaft from the first part and is configured to press the frame. In accordance with the thirteenth aspect, the second part presses the frame in a preferred manner.

In accordance with a fourteenth aspect of the present disclosure, the bicycle component according to the thirteenth aspect is configured so that the housing includes a female thread, and the first part has an inner circumferential surface that defines the through hole and an outer circumferential surface that includes a male thread joined with the female thread. In accordance with the fourteenth aspect, the female thread and the male thread are joined to stably mount the bicycle component on the frame.

In accordance with a fifteenth aspect of the present disclosure, the bicycle component according to the thirteenth aspect is configured so that the housing includes a male thread, and the first portion has an inner circumferential surface including a female thread joined with the male thread. In accordance with the fifteenth aspect, the female thread of the first portion is joined with the male thread of the housing to stably mount the bicycle component on the frame.

In accordance with a sixteenth aspect of the present disclosure, the bicycle component according any one of the eleventh to fifteenth aspects is configured so that the first mounting portion further includes a tool engagement portion that is engageable with a tool. In accordance with the sixteenth aspect, the bicycle component is easily mounted on the frame with a tool.

In accordance with a seventeenth aspect of the present disclosure, the bicycle component according any one of the first to sixteenth aspects further includes a second mounting portion configured to mount the housing on the frame of the bicycle. The first mounting portion is provided on a first side surface of the housing in an axial direction of the crankshaft, and the second mounting portion is provided on a second side surface of the housing at an opposite side of the first side surface in the axial direction of the crankshaft. In accordance with the seventeenth aspect, the bicycle component is stably mounted on the frame.

In accordance with an eighteenth aspect of the present disclosure, the bicycle component according to the seventeenth aspect is configured so that the second mounting portion includes a threaded hole formed in the housing and a first coupling member extended through the frame and coupled to the threaded hole. In accordance with the eighteenth aspect, the second mounting portion stably mounts the bicycle component on the frame.

In accordance with a nineteenth aspect of the present disclosure, the bicycle component according to the eighteenth aspect is configured so that the second mounting member includes a plurality of threaded holes and a plurality of first coupling members, and the threaded holes and the first coupling members are arranged at intervals around the crankshaft. In accordance with the nineteenth aspect, the second mounting portion further stably mounts the bicycle component on the frame.

In accordance with a twentieth aspect of the present disclosure, the bicycle component according any one of the first to nineteenth aspects further includes a third mounting portion configured to mount the housing on the frame of the bicycle. The third mounting portion is provided on the housing in a direction intersecting an axial direction of the crankshaft. In accordance with the twentieth aspect, the third mounting portion restricts rotation of the bicycle component about the crankshaft in a preferred manner.

In accordance with a twenty-first aspect of the present disclosure, the bicycle component according to the twentieth aspect is configured so that the third mounting portion includes a threaded hole formed in the housing and a second coupling member extended through the frame and coupled to the threaded hole. In accordance with the twenty-first aspect, the third mounting portion stably mounts the bicycle component on the frame.

In accordance with a twenty-second aspect of the present disclosure, the bicycle component according any one of the first to twenty-first aspects further includes a motor provided on the housing. The motor is configured to assist propulsion of the bicycle. In accordance with a twenty-second aspect, the bicycle component including the motor can be reduced in size in a direction orthogonal to the crankshaft.

In accordance with a twenty-third aspect of the present disclosure, in the bicycle component according any one of the first to twenty-second aspects, the housing is configured to be at least partially accommodated in the frame. In accordance with the twenty-third aspect, the design of the bicycle can be improved.

The bicycle component in accordance with the present disclosure allows the bicycle component to be reduced in size in a direction orthogonal to the crankshaft.

BRIEF DESCRIPTION OF THE DRAWINGS

Referring now to the attached drawings which form a part of this original disclosure.

FIG. 15 is a cross-sectional view of a part of a first mounting portion in a fourth modification.

FIG. 16 is a cross-sectional view of a part of a first mounting portion in a fifth modification.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle 10 including a bicycle component 40 in accordance with a first embodiment will now be described with reference to FIGS. 1 to 9. The bicycle 10 is a road bike. However, the present disclosure is also applicable to a bicycle other than a road bike such as a mountain bike and a city bike. The vertical direction of the bicycle 10 is the vertical direction in a state in which the bicycle 10 is ridable and held upright on a level surface. The sideward direction of the bicycle 10 is the sideward direction as viewed in the traveling direction of the bicycle 10 in a state in which the bicycle 10 is ridable and held upright on a level surface.

Figure 1:
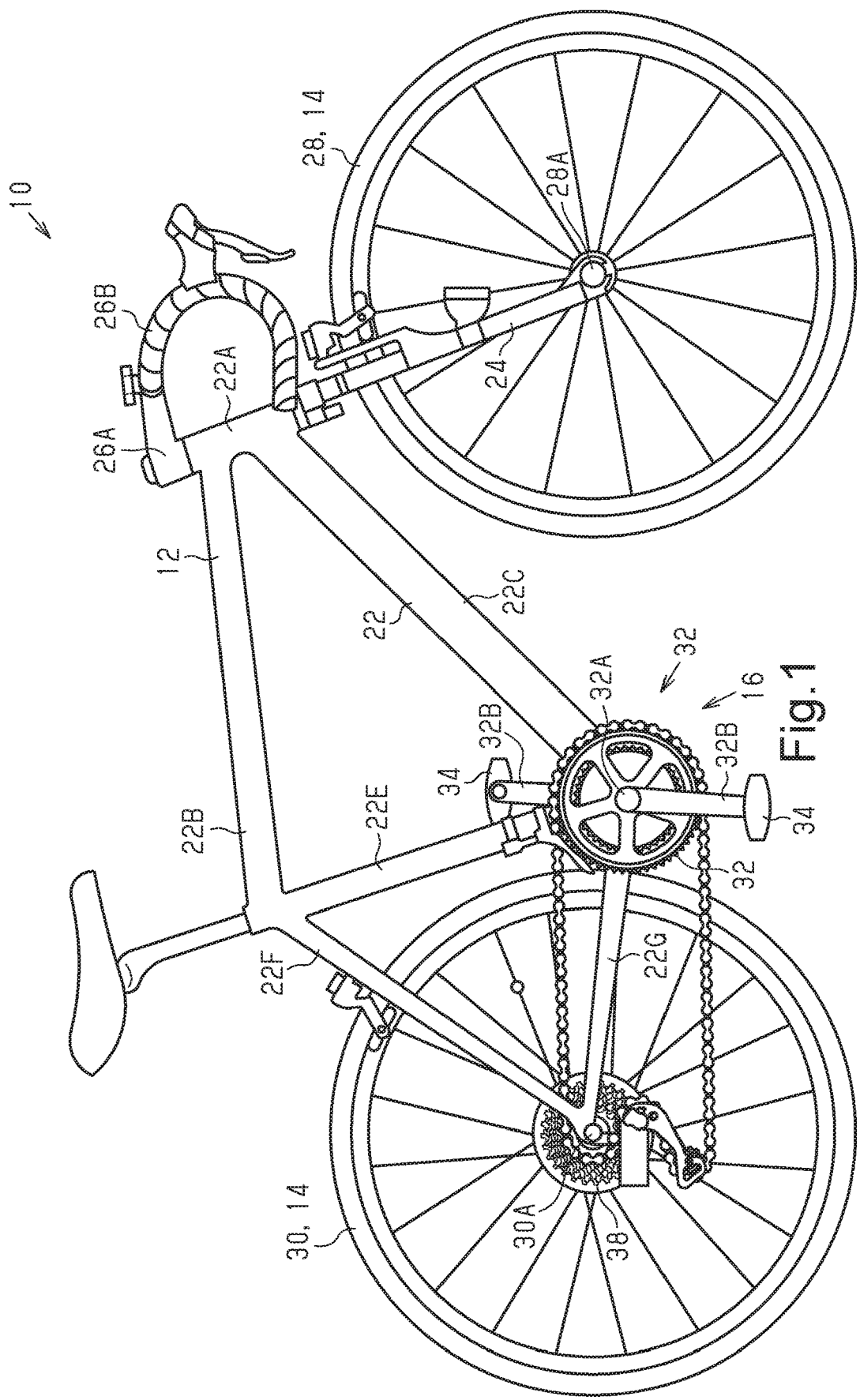
FIG. 1 is a side elevational view of a bicycle including a bicycle component in accordance with a first embodiment.
Figure 2:
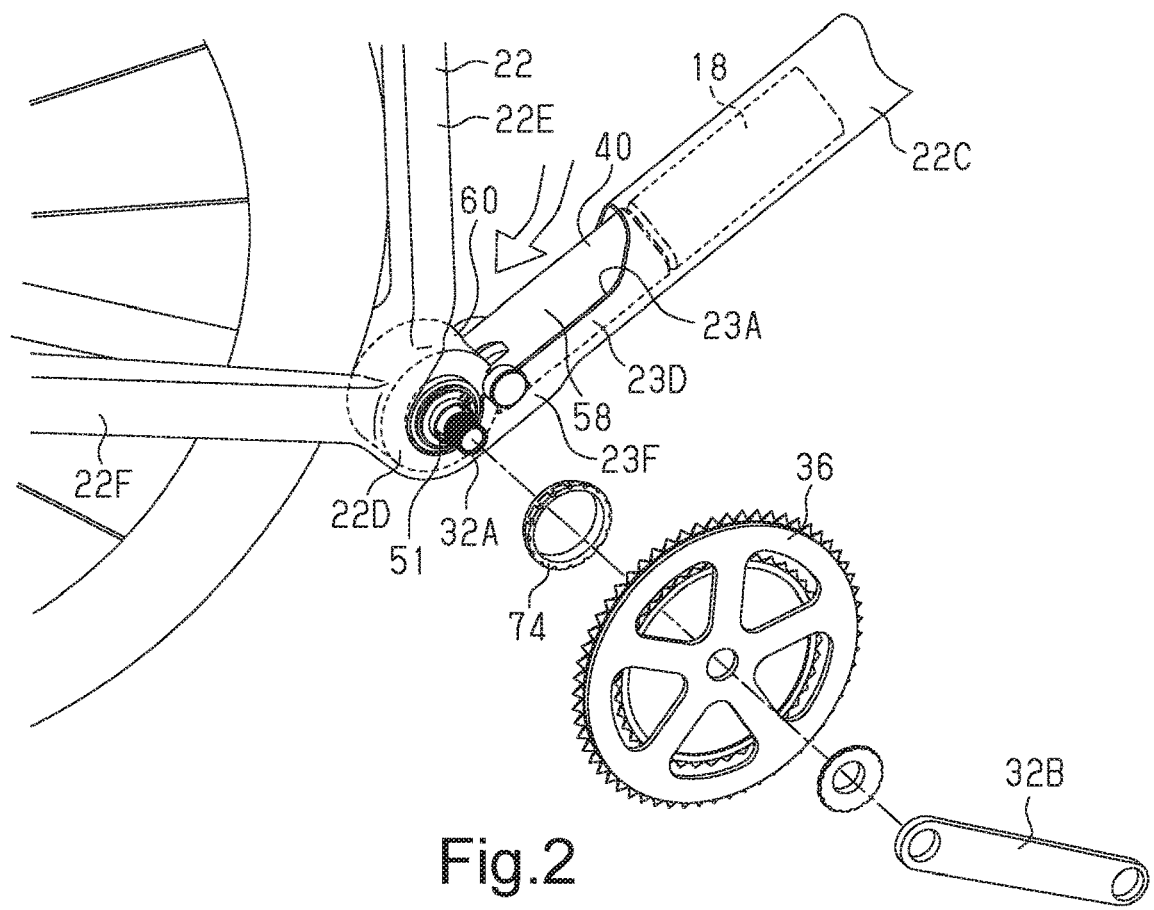
FIG. 2 is a perspective view of a portion in the vicinity of a crankshaft of the bicycle illustrated in FIG. 1.

As shown in FIGS. 1 and 2, the bicycle 10 includes a bicycle body 12, a pair of wheels 14, a drive mechanism 16, a battery 18 and the bicycle component 40. In the present embodiment, the bicycle component 40 is a bicycle drive unit. The bicycle body 12 includes a frame 22, a front fork 24 and a handlebar 26B. The front fork 24 is connected to the frame 22. The handlebar 26B is connected in an attachable and removable manner to the front fork 24 by a stem 26A. The front fork 24 is supported by the frame 22.

The frame 22 includes a head tube 22A, a top tube 22B, a down tube 22C, a component mounting portion 22D, a seat tube 22E, a seat stay 22F and a chain stay 22G. The component mounting portion 22D is connected to the down tube 22C, the seat tube 22E, and the seat stay 22F.

The wheels 14 include a front wheel 28 and a rear wheel 30. The front wheel 28 includes an axle 28A connected to an end of the front fork 24. The rear wheel 30 includes an axle 30A connected to a rear end of the frame 22.

The drive mechanism 16 includes a crank 32 and a pair of pedals 34. The crank 32 includes a crankshaft 32A and a pair of crank arms 32B. The drive mechanism 16 transmits manual driving force, which is applied to the pedals 34, to the rear wheel 30. The drive mechanism 16 includes a front rotation body 36 coupled to an output portion 51 of the bicycle component 40. The front rotation body 36 includes a sprocket, a pulley, or a bevel gear. The drive mechanism 16 is configured to transmit rotation of the crank 32 through, for example, a chain, a belt, or a shaft, to a rear rotation body 38 coupled to the rear wheel 30. The rear rotation body 38 includes a sprocket, a pulley, or a bevel gear. A one-way clutch (not shown) is provided between the rear rotation body 38 and the rear wheel 30. The one-way clutch is configured to allow forward rotation of the rear rotation body 38 in case the rear wheel 30 rotates forward and restrict rearward rotation of the rear rotation body 38 in case the rear wheel 30 rotates rearward. The front rotation body 36 can include a plurality of front sprockets. The rear rotation body 38 can include a plurality of rear sprockets. The crankshaft 32A can be included in the bicycle component 40.

As shown in FIG. 2, the component mounting portion 22D is connected to the frame 22 at each of the lower end of the down tube 22C, the lower end of the seat tube 22E, and the front end of the chain stay 22G. The component mounting portion 22D is configured to accommodate at least part of the bicycle component 40. Preferably, the component mounting portion 22D is formed integrally with the down tube 22C, the seat tube 22E, and the chain stay 22G but can be connected through welding, adhesion, or the like. The frame 22 includes a first open portion 23A to accommodate the bicycle component 40 and the battery 18 in the frame 22. The first open portion 23A opens toward the upper side of the bicycle 10, and is provided over the component mounting portion 22D, the portion of the seat tube 22E connected to the component mounting portion 22D, and the portion of the down tube 22C connected to the component mounting portion 22D. The component mounting portion 22D includes a first side wall 23D, a second side wall 23E and a bottom wall 23F. The first side wall 23D is located at the right side of the bicycle 10. The second side wall 23E is located at the left side of the bicycle 10 (refer to FIG. 4). The bottom wall 23F is located at the lower side of the bicycle 10. The first side wall 23D and the second side wall 23E are connected to the down tube 22C, the seat tube 22E and the chain stay 22G. The bottom wall 23F is connected to the lower end of the first side wall 23D, the lower end of the second side wall 23E, the down tube 22C and the chain stay 22G. The first open portion 23A includes an opening extending in the side walls 23D and 23E of the component mounting portion 22D to where the crankshaft 32A is located. Preferably, a cover 23B (refer to FIG. 4) is attached to the first open portion 23A. The cover 23B closes the opening of the first open portion 23A. The bottom wall 23F of the component mounting portion 22D includes a second open portion 23C (refer to FIG. 6). The bicycle component 40 is inserted into the opening of the first open portion 23A from the upper side and mounted on the frame 22. The second open portion 23C includes an opening that extends in the widthwise direction of the bicycle 10, for example, to the first side wall 23D and the second side wall 23E.

The battery 18 includes one or more battery cells. The battery cells include rechargeable batteries. The battery 18 is mounted on the bicycle 10 to supply the bicycle component 40 with electrical power. The battery 18 is accommodated in the frame 22. Preferably, the battery 18 is accommodated in the down tube 22C.

At least part of the bicycle component 40 is arranged inside the frame 22. The bicycle component 40 of the present embodiment is located in the interior of the component mounting portion 22D. One end of the bicycle component 40 is provided in the part of the component mounting portion 22D connected to the seat stay 22F and the chain stay 22G. The other end of the bicycle component 40 is connected to the battery 18. The bicycle component 40 and the battery 18 are aligned in the longitudinal direction of the down tube 22C.

Figure 3:
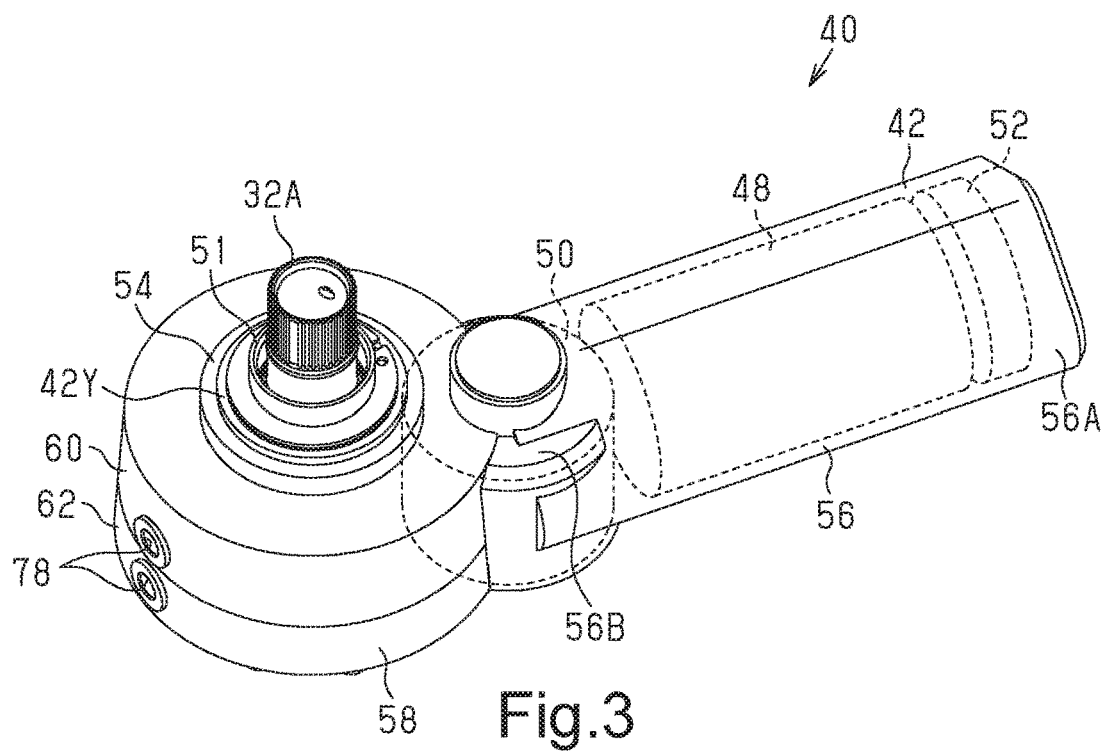
FIG. 3 is a perspective view of the bicycle component in accordance with the first embodiment.
Figure 4:
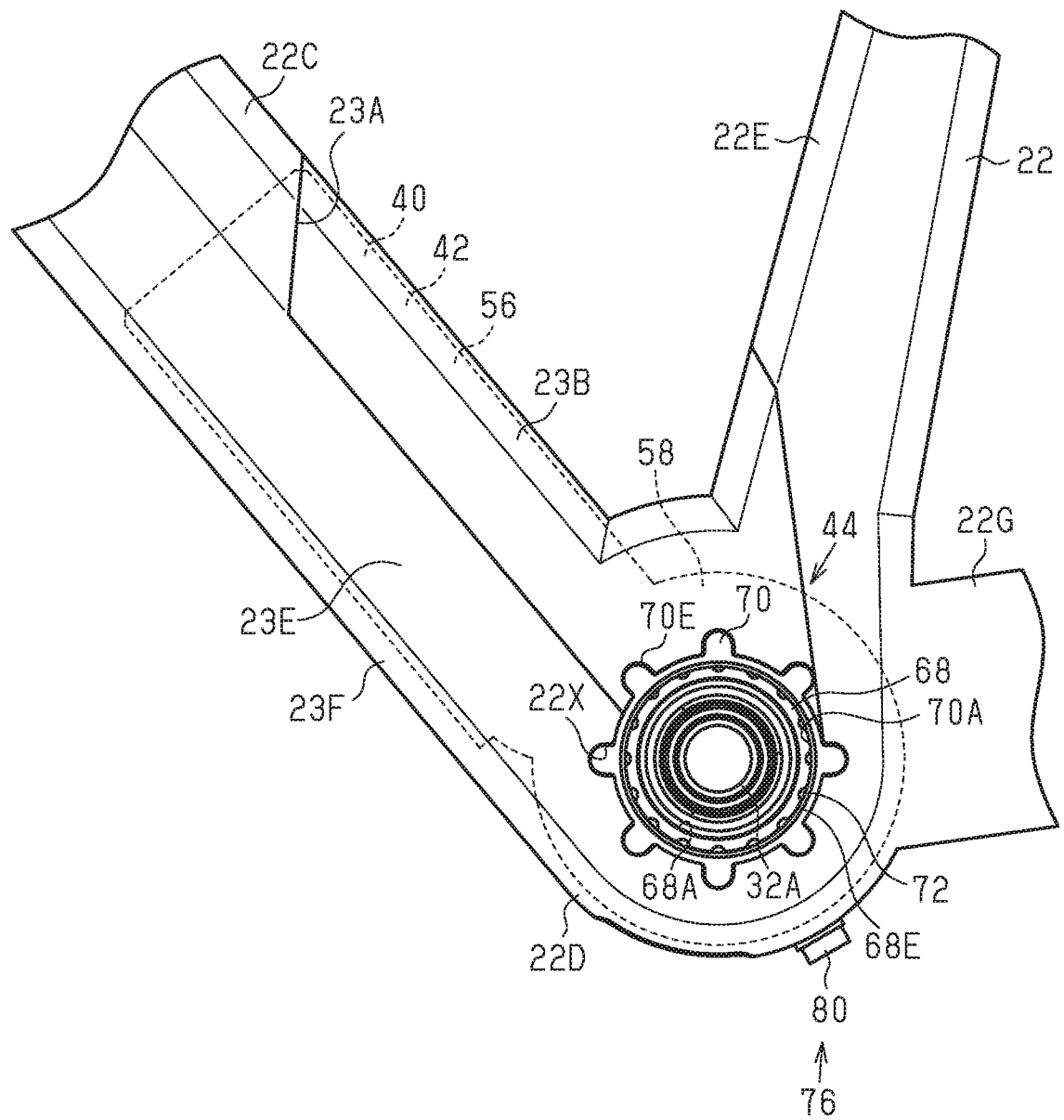
FIG. 4 is a left side elevational view of the portion in the vicinity of the crankshaft of the bicycle illustrated in FIG. 2.
Figure 5:
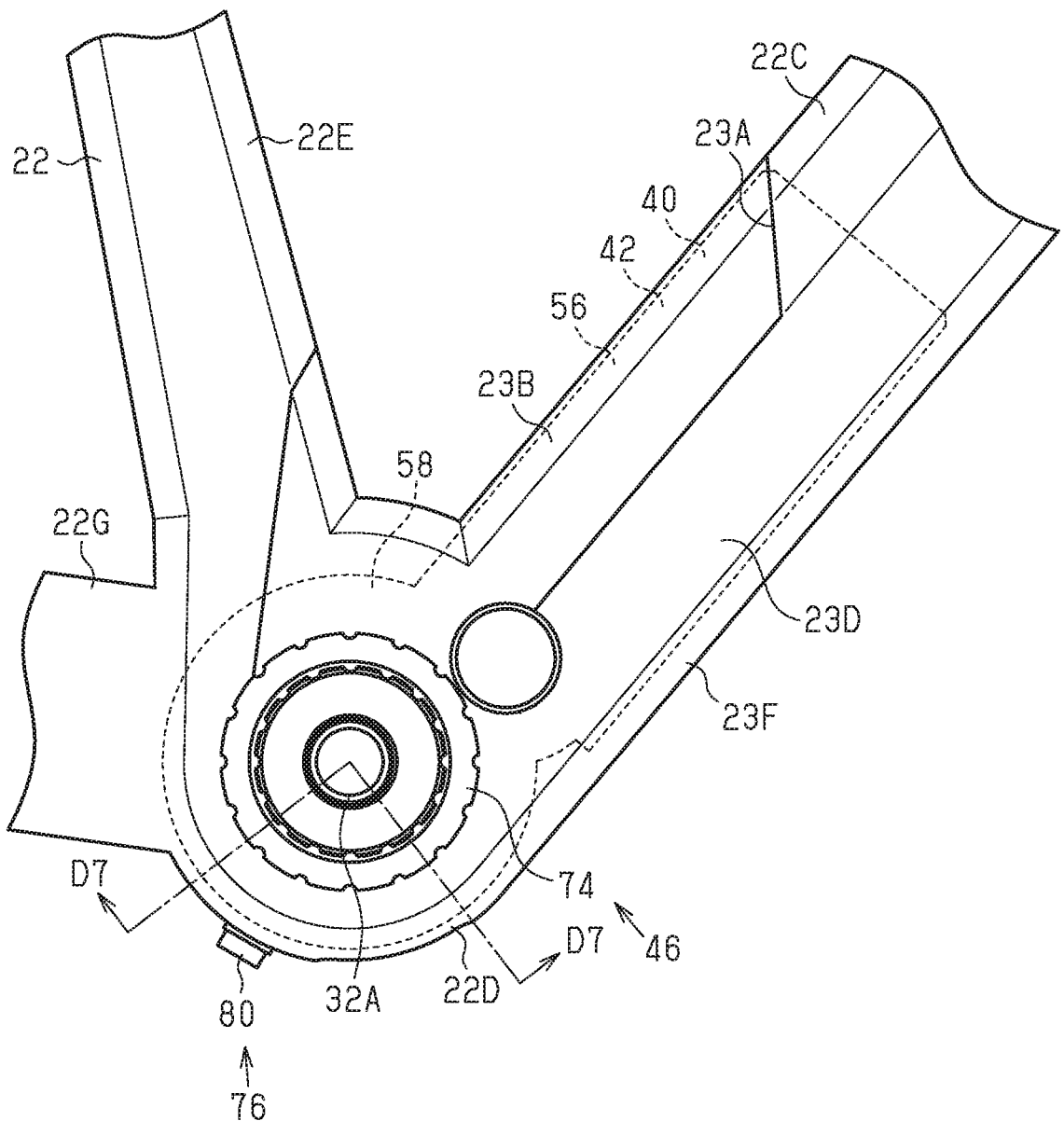
FIG. 5 is a right side elevational view of the portion in the vicinity of the crankshaft of the bicycle illustrated in FIG. 2.

As shown in FIGS. 3 to 5, the bicycle component 40 includes a housing 42 and a first mounting portion 44. The first mounting portion 44 is configured to mount the housing 42 on the bicycle 10. The bicycle component 40 further includes a second mounting portion 46 that is configured to mount the housing 42 on the frame 22 of the bicycle 10. The housing 42 supports the crankshaft 32A of the bicycle 10. The housing 42 includes a support 54 that supports the crankshaft 32A. The housing 42 accommodates at least part of a motor 48. The two axial ends of the crankshaft 32A each project out of the housing 42.

The motor 48 is provided on the housing 42. In this embodiment, the motor 48 is provided in the housing 42. The housing 42 is configured so that it can be at least partially accommodated in the frame 22. The motor 48 is included in the bicycle component 40. The motor 48 is configured to assist in propulsion of the bicycle 10. The motor 48 includes an electric motor. The motor 48 is a brushless motor. The bicycle component 40 includes a reduction gear 50 and an electronic controller 52. The reduction gear 50 reduces the speed of the rotation generated by the motor 48 and then outputs the rotation. In one example, the motor 48 includes an output shaft of which axial direction is orthogonal to the axial direction of the crankshaft 32A. Preferably, in this case, the reduction gear 50 converts the rotation of the output shaft of the motor 48 to rotation in a direction orthogonal to the output shaft of the motor 48. The axis of the output shaft of the motor 48 can be orthogonal to or offset from the axis of the crankshaft 32A. The reduction gear 50 can include, for example, bevel gears. The reduction gear 50 can further include a planetary gear mechanism. The reduction gear 50 outputs the rotation of the motor 48 to the output portion 51 that extends around the crankshaft 32A. The rotation of the motor 48 is transmitted by the reduction gear 50 and the output portion 51 to the front rotation body 36.

The controller 52 includes a substrate and a drive circuit. The drive circuit includes an inverter circuit and controls the power supplied from the battery 18 to the motor 48. The controller 52 includes at least one processor that executes predetermined control programs. The processor includes, for example, a central processing unit (CPU) or a micro-processing unit (MPU). The controller 52 can include one or more microcomputers. The controller 52 can further include a memory device and a timer. The memory device stores various types of control programs and information used for various types of processing. The memory device is any computer storage device or any computer readable medium with the sole exception of a transitory, propagating signal. For example, the memory device includes a non-volatile memory device and a non-volatile memory device, and can includes a ROM (Read Only Memory) device, a RAM (Random Access Memory) device, a hard disk, a flash drive, etc.

The housing 42 includes a first accommodation portion 56 and a second accommodation portion 58. The first accommodation portion 56 includes a cylindrical part. The first accommodation portion 56 accommodates the motor 48, a part of the reduction gear 50 and the controller 52. Preferably, one longitudinal end 56A of the first accommodation portion 56 is provided with an electric terminal that electrically connects the battery 18 and the controller 52. Preferably, the second accommodation portion 58 is disc-shaped as viewed in the axial direction of the crankshaft 32A. The second accommodation portion 58 is connected to the other end 56B in a longitudinal direction of a first housing 60. The first accommodation portion 56 can be formed integrally with or separately from the second accommodation portion 58. At least part of the first accommodation portion 56 can be formed integrally with at least part of the second accommodation portion 58. The support 54 is provided in the second accommodation portion 58. The support 54 rotatably supports the crankshaft 32A.

Figure 7:
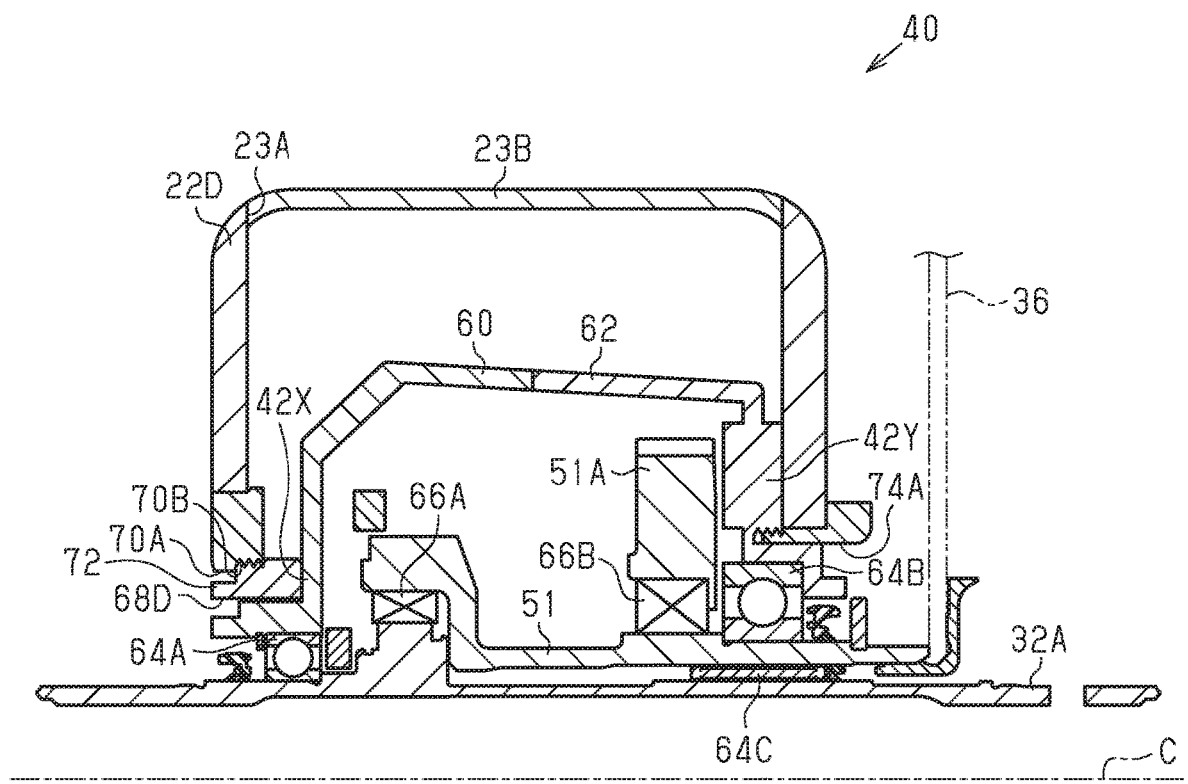
FIG. 7 is a cross-sectional view of the portion in the vicinity of the crankshaft of the bicycle illustrated in FIG. 2 as seen along section line D7-D7 in FIG. 5.
Figure 7:
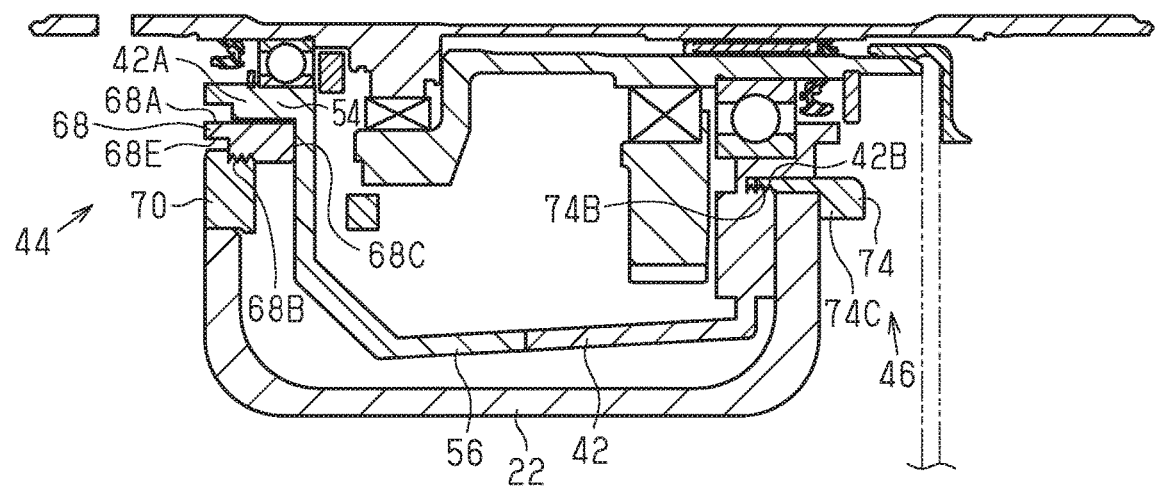

As shown in FIGS. 3 and 7, the housing 42 is formed by the first housing 60 and a second housing 62. The first housing 60 includes one of the side surfaces of the housing 42 in the axial direction of the crankshaft 32A. The second housing 62 includes the other one of the side surfaces of the housing 42 in the axial direction of the crankshaft 32A. The first housing 60 and the second housing 62 are joined to form an accommodation space inside the housing 42. The first housing 60 and the second housing 62 are fixed to each other by, for example, a plurality of bolts.

The bicycle component 40 further includes a first bearing 64A, a second bearing 64B, a first one-way clutch 66A and a second one-way clutch 66B. The first bearing 64A is provided between the first housing 60 and the crankshaft 32A to support the crankshaft 32A rotatably relative to the first housing 60. The second bearing 64B is provided between the second housing 62 and the output portion 51 to support the output portion 51 rotatably relative to the second housing 62. The first bearing 64A and the second bearing 64B are spaced apart from each other in the axial direction of the crankshaft 32A. The first bearing 64A is provided near the end of the housing 42 at one side in the axial direction of the crankshaft 32A. The second bearing 64B is provided near the end of the housing 42 at the other side in the axial direction of the crankshaft 32A.

The output portion 51 is coaxial with the crankshaft 32A. The output portion 51 is cylindrical. The output portion 51 covers part of the outer circumferential surface of the crankshaft 32A. The output portion 51 projects out of the housing 42 at the other side in the axial direction of the crankshaft 32A. The end of the crankshaft 32A at the other side in the axial direction extends from the output portion 51 toward the other side in the axial direction of the crankshaft 32A.

The first one-way clutch 66A is provided between the crankshaft 32A and the output portion 51. The first one-way clutch 66A is provided near the end of the output portion 51 at one side in the axial direction of the crankshaft 32A. Part of the first one-way clutch 66A can be formed integrally with at least one of the crankshaft 32A or the output portion 51, or both. For example, the first one-way clutch 66A includes a roller clutch. In this case, the inner race of the first one-way clutch 66A can be formed integrally with the crankshaft 32A, and the outer race of the first one-way clutch 66A can be formed integrally with the output portion 51.

A third bearing 64C is provided between the crankshaft 32A and the end of the output portion 51 at the other side in the axial direction of the crankshaft 32A. The third bearing 64C includes, for example, a sleeve or a needle bearing. The crankshaft 32A is supported by the second bearing 64B through the third bearing 64C and the output portion 51. Preferably, at least parts of the second bearing 64B and the third bearing 64C are located at overlapping positions in a direction orthogonal to the crankshaft 32A.

The first one-way clutch 66A transmits rotation in a first rotation direction of the crankshaft 32A to the output portion 51, and does not transmit rotation in the first rotation direction of the output portion 51 to the crankshaft 32A. The second one-way clutch 66B is provided between the output portion 51 and a gear 51A for connecting the output portion 51 and the reduction gear 50. The second one-way clutch 66B transmits rotation in a first rotation direction of the motor 48 to the output portion 51, and does not transmit rotation in the first rotation direction of the output portion 51 to the motor 48. The first rotation direction of the crankshaft 32A is the direction in which the crankshaft 32A is rotated when the bicycle 10 is being moved forward. The first rotation direction of the output portion 51 is the direction in which the output portion 51 is rotated when the bicycle 10 is being moved forward. The first rotation direction of the motor 48 is the direction of the rotation of the motor 48 in a case in which the motor 48 moves the bicycle 10 forward. The output portion 51 and the housing 42 are provided with a torque sensor (not shown) that detects the rotation force transmitted to the output portion 51. The torque sensor includes, for example, a strain sensor or a magnetostrictive sensor. The controller 52 controls the motor 48 in accordance with the output of the torque sensor.

As shown in FIG. 4, the housing 42 is configured to be at least partially accommodated in the frame 22. More specifically, the housing 42 is configured so that at least part of the first accommodation portion 56 is accommodated in the part of the component mounting portion 22D at the side connected to the down tube 22C and so that the second accommodation portion 58 is accommodated in the part of the component mounting portion 22D at the side connected to the seat tube 22E and the chain stay 22G. Preferably, the housing 42 is mounted on the frame 22 so that the rotation axis of the motor 48 extends in the longitudinal direction of the down tube 22C. The part of the component mounting portion 22D accommodating the first accommodation portion 56 can be included in the down tube 22C.

As shown in FIGS. 4 and 7, the first mounting portion 44 includes a first member 68 and a second member 70. The first mounting portion 44 is provided on the housing 42 independently from the support 54. The first mounting portion 44 and the second mounting portion 46 are spaced apart from each other in a predetermined direction. The predetermined direction is parallel to the axial direction C of the crankshaft 32A. The first mounting portion 44 is provided on a first side surface 42X of the housing 42 in the axial direction C of the crankshaft 32A. The second mounting portion 46 is provided on a second side surface 42Y of the housing 42 at the opposite side of the first side surface 42X in the axial direction C of the crankshaft 32A. The first side surface 42X includes one of the side surfaces of the second accommodation portion 58 in the axial direction C of the crankshaft 32A. The second side surface 42Y includes the other one of the side surfaces of the second accommodation portion 58 in the axial direction C of the crankshaft 32A.

The first member 68 is ring-shaped. Further, the first member 68 includes a first hole 68A extending in a first direction. The first hole 68A includes a through hole through which the crankshaft 32A extends. The first member 68 includes a through hole. The first direction coincides with the axial direction C of the crankshaft 32A. The first member 68 includes a male thread 68B. The male thread 68B is formed on the outer circumferential portion of the first member 68. The first member 68 is configured to support the housing 42 in a direction intersecting the first direction and the axial direction C of the crankshaft 32A. The housing 42 includes an insertion portion 42A inserted into the first hole 68A of the first member 68. Preferably, the insertion portion 42A is included in the support 54. The first member 68 includes an inner circumferential portion 68D that supports the insertion portion 42A. Preferably, the part of the first member 68 into which the insertion portion 42A is inserted has an inner diameter that is slightly larger than the outer diameter of the insertion portion 42A.

Figure 8:
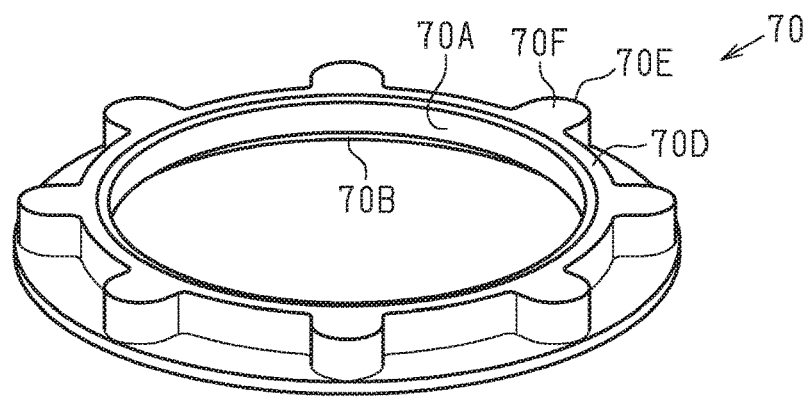
FIG. 8 is a perspective view of a second member of the bicycle component illustrated in FIG. 7.

The second member 70 is ring-shaped. At least part of the second member 70 is provided between the housing 42 and the frame 22. At least part of the second member 70 is provided between the first member 68 and the frame 22. The second member 70 is configured to contact part of the frame 22 in a direction intersecting the first direction and the axial direction C of the crankshaft 32A. The second member 70 contacts the second side wall 23E of the component mounting portion 22D. The second member 70 includes a hole 70A extending in the first direction. Further, the second member 70 includes a female thread 70B joined with the male thread 68B of the first member 68. The female thread 70B is formed on the inner circumferential portion of the second member 70. As shown in FIG. 8, the second member 70 includes a side surface 70D that defines a frame engagement portion 70E. The frame engagement portion 70E includes a plurality of projections 70F projecting in the axial direction of the crankshaft 32A. The projections 70F are arranged in intervals in the circumferential direction of the crankshaft 32A.

The frame 22 includes a plurality of recesses 22X corresponding to the projections 70F of the frame engagement portion 70E. The projections 70F of the frame engagement portion 70E are fitted into the recesses 22X of the frame 22 to restrict rotation of the second member 70 about its center axis relative to the frame 22. The ends of the projections 70F can be linked in a ring-shaped manner at the inner circumferential side of the second member 70.

The first member 68 is configured to press the housing 42. More specifically, the first member 68 is configured to be coupled with the second member 70. The first member 68 has a first end surface 68C that presses the housing 42 in the first direction under the force of the second member 70. The second member 70 is configured to press the frame 22. More specifically, the parts in the side surface 70D of the second member 70 between the projections 70F are configured to contact the part of the frame 22 faced toward the second side surface 42Y of the housing 42.

At least one of the first member 68 or the second member 70, or both includes a tool engagement portion 72 that is engageable with a tool. Preferably, the tool engagement portion 72 is defined by at least one of the inner circumferential portion 68D or an outer circumferential portion 68E of the first member 68, or both. In the present embodiment, the tool engagement portion 72 is defined by the inner circumferential portion 68D of the first member 68. The tool engagement portion 72 includes a plurality of recesses and a plurality of projections. The projections project in the radial direction of the crankshaft 32A. The projections and the recesses are alternatively arranged at predetermined intervals in the circumferential direction around the crankshaft 32A. The projections and the recesses are formed in the inner circumferential portion 68D of the first member 68.

As shown in FIGS. 5 and 7, the second mounting portion 46 includes a threaded hole 42B and a first coupling member 74. The threaded hole 42B is formed in the housing 42. The first coupling member 74 is ring-shaped. The first coupling member 74 includes a hole 74A extending in the first direction. The first coupling member 74 is extended through the frame 22 and coupled to the threaded hole 42B. The first coupling member 74 extends through the first side wall 23D of the component mounting portion 22D. The threaded hole 42B includes a female thread. The first coupling member 74 includes a male thread 74B joined with the female thread of the threaded hole 42B. The outer circumferential portion of the first coupling member 74 includes a part where the male thread 74B is formed and a side wall 74C extending outward in the radial direction from the part where the male thread 74B is formed. The first coupling member 74 corresponds to a coupling member that is extended through the frame 22 and coupled to the threaded hole 42B. The side wall 74C is configured to sandwich the frame 22 with the housing 42. Preferably, at least one of the outer circumferential portion or the inner circumferential portion of the side wall 74C, or both defines a tool engagement portion that is engageable with a tool. The tool engagement portion includes, for example, a plurality of recesses and a plurality of projections shaped to be recessed or projected in the radial direction of the first coupling member 74. The threaded hole 42B can include a male thread instead of a female thread. In this case, the male thread on the outer circumferential portion of the first coupling member 74 is omitted, and a female thread joined with the threaded hole 42B is formed in the inner circumferential portion of the first coupling member 74.

Figure 6:
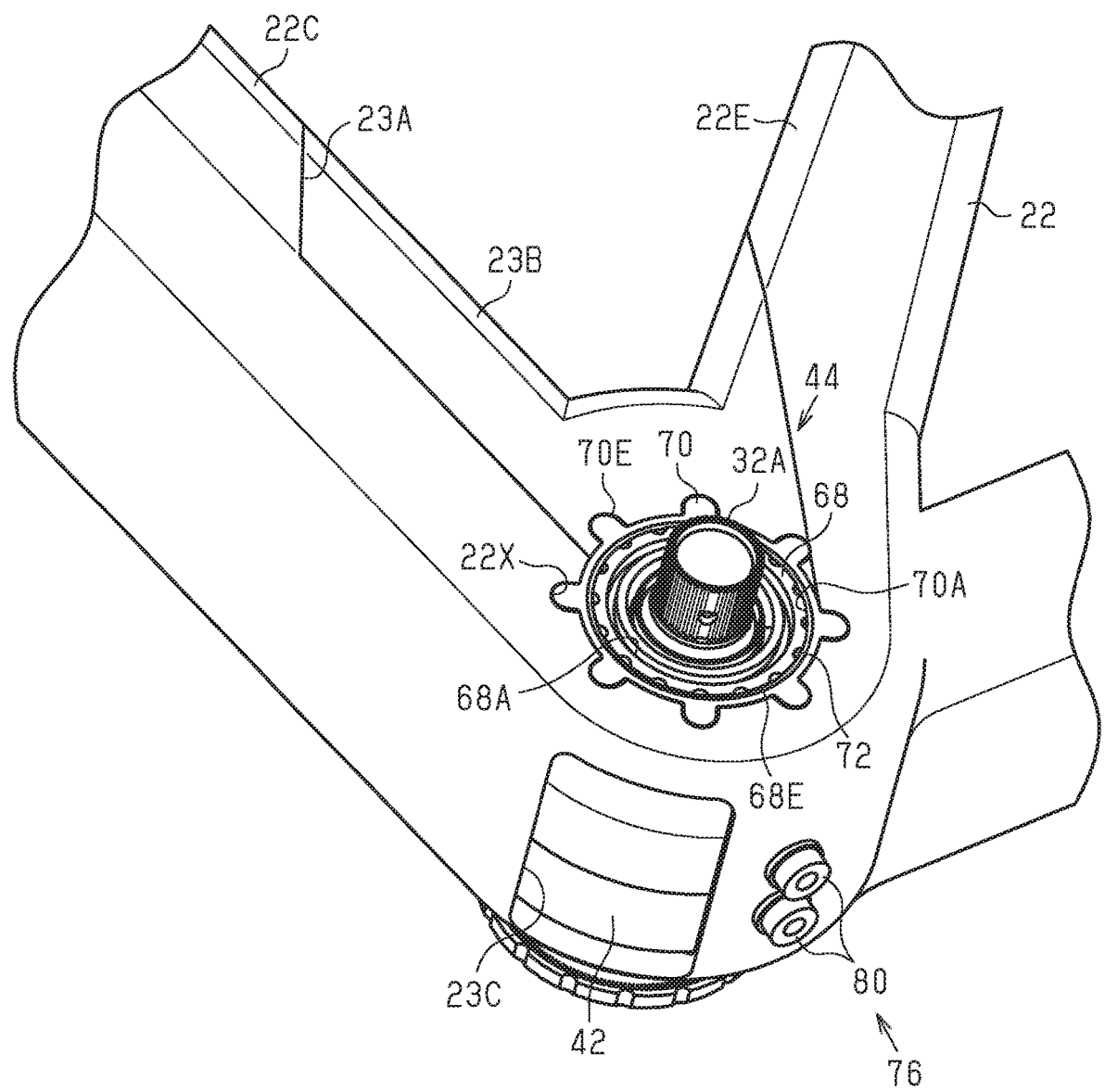
FIG. 6 is a perspective view of the portion in the vicinity of the crankshaft of the bicycle illustrated in FIG. 2.

Preferably, the bicycle component 40 further includes a third mounting portion 76 that is configured to mount the housing 42 on the frame 22. As shown in FIG. 6, the third mounting portion 76 is provided on the housing 42 in a direction intersecting the axial direction of the crankshaft 32A. The third mounting portion 76 includes threaded holes 78 and second coupling members 80. The threaded holes 78 are formed in the housing 42. The second coupling members 80 are extended through the frame 22 and coupled to the threaded holes 78. The second coupling members 80 include bolts. The second coupling members 80 can be configured including a plurality of threaded holes and a plurality of bolts. Preferably, in this case, the threaded holes are located at intervals in the axial direction of the crankshaft 32A.

Figure 9:
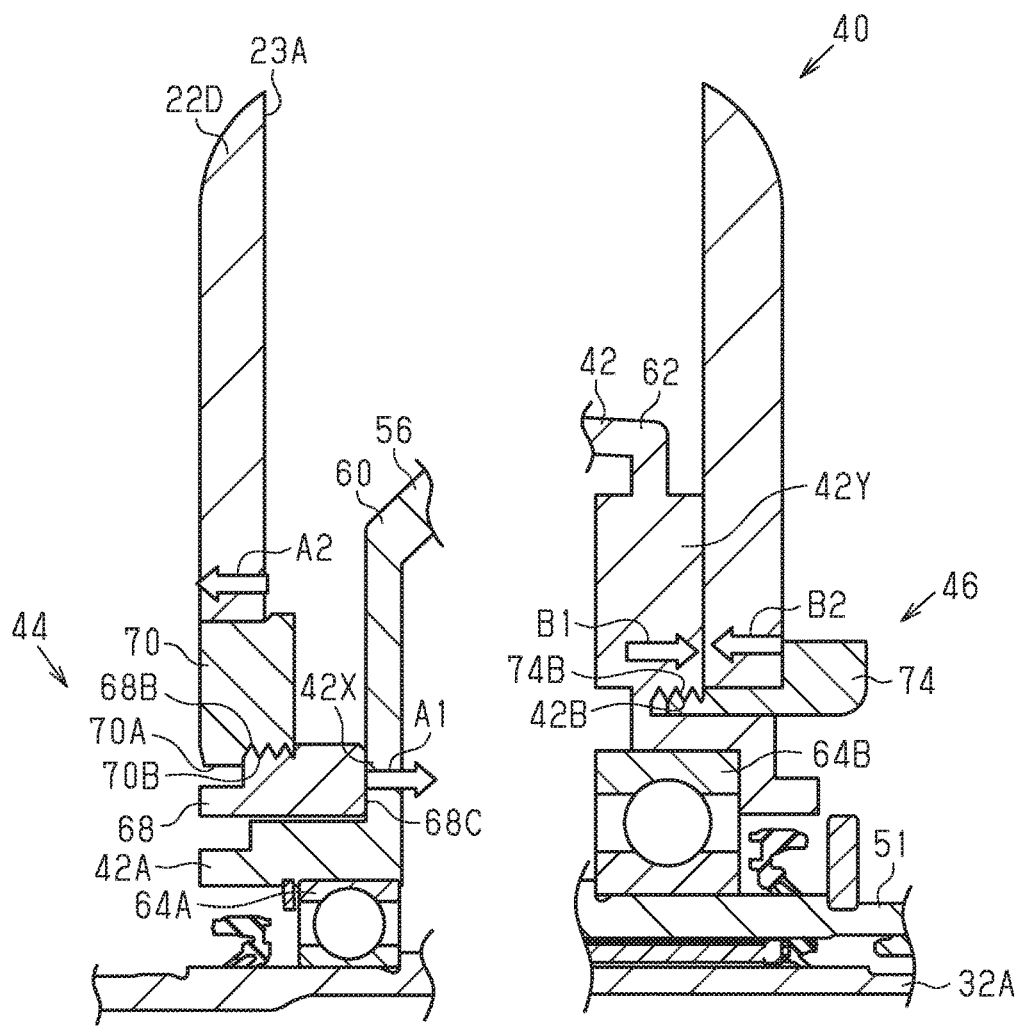
FIG. 9 is a partially enlarged cross-sectional view of the portion in the vicinity of the crankshaft of the bicycle illustrated in FIG. 7.

As shown in FIG. 9, the first mounting portion 44 is configured to apply force to the housing 42 and the frame 22 acting to move the housing 42 and the frame 22 away from each other. The first mounting portion 44 is configured to apply force to the housing 42 and the frame 22 acting to move the housing 42 and the frame 22 away from each other in the axial direction C of the crankshaft 32A. More specifically, the first member 68 presses the housing 42 with the first end surface 68C to apply force to the housing 42 acting toward the second mounting portion 46 in direction A1. The second member 70 applies force with the axial force of the second member 70 to the frame 22 acting in direction A2, which is opposite to direction A1.

The second mounting portion 46 is configured to apply force to the housing 42 and the frame 22 acting to move the housing 42 and the frame 22 toward each other. The second mounting portion 46 is configured to apply force to the housing 42 and the frame 22 acting to move the housing 42 and the frame 22 toward each other in the axial direction C of the crankshaft 32A. More specifically, the first coupling member 74 applies force with the axial force of the first coupling member 74 to the housing 42 acting in direction B1 toward the frame 22. The first coupling member 74 applies force with the first coupling member 74 to the frame 22 acting in direction B2, which is opposite to direction B2.

In the housing 42, the first housing 60 is pressed toward the second housing 62. This restricts separation of the portions joining the first housing 60 and the second housing 62. Thus, deformation and the formation of a gap are limited in the housing 42.

Second Embodiment

A bicycle component 40 in accordance with a second embodiment will now be described with reference to FIG. 10. The bicycle component 40 in accordance with the second embodiment differs from the bicycle component 40 in accordance with the first embodiment only in the position where the bicycle component 40 is mounted on the frame 22. Otherwise, the bicycle component 40 in accordance with the second embodiment is the same as the bicycle component 40 in accordance with the first embodiment. Thus, same reference numerals are given to those components that are the same as the corresponding components of the first embodiment. Such components will not be described in detail. In the present embodiment, at least part of the first accommodation portion 56 of the housing 42 is accommodated in the seat tube 22E.

Figure 10:
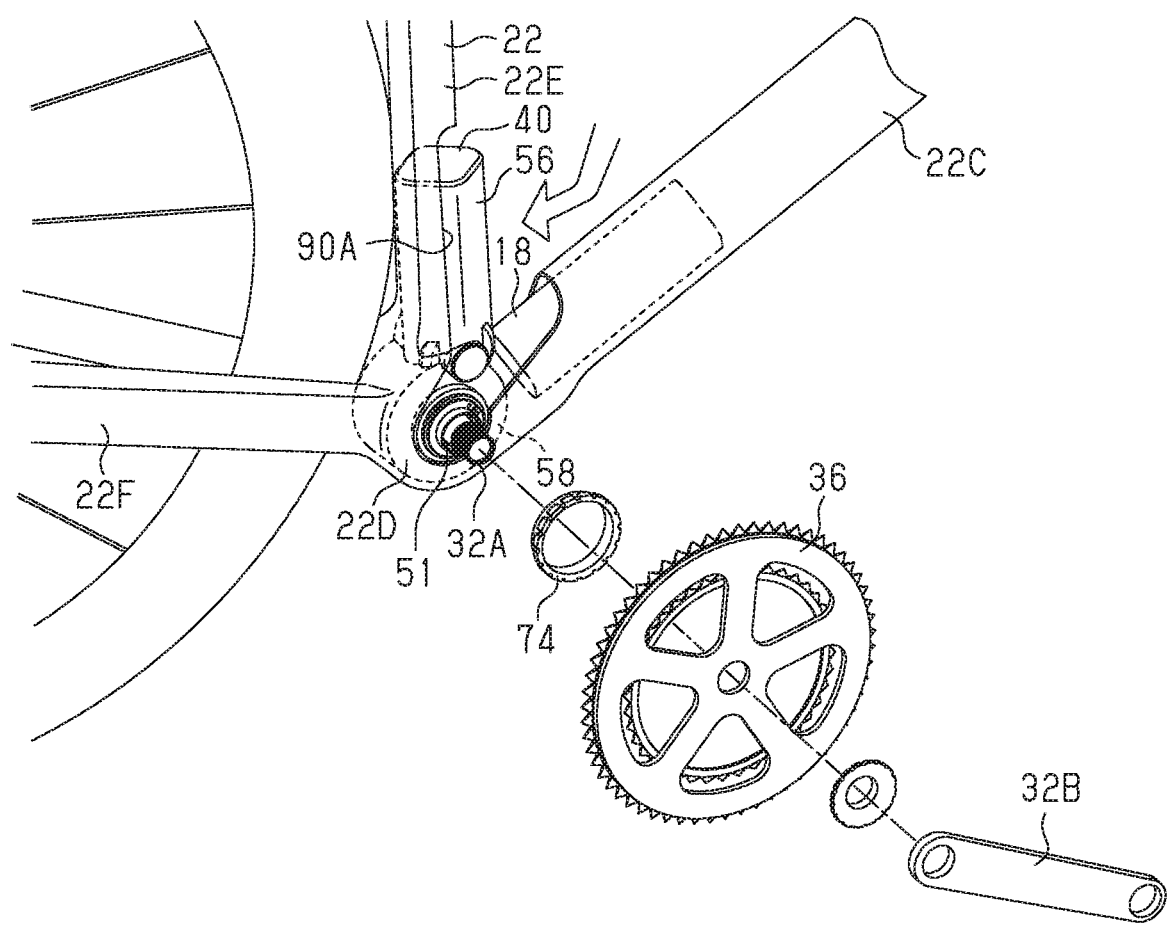
FIG. 10 is a perspective view of a portion in the vicinity of a crankshaft in a bicycle including a bicycle component in accordance with a second embodiment.

As shown in FIG. 10, the first accommodation portion 56 of the housing 42 is accommodated in at least part of the seat tube 22E, and the second accommodation portion 58 of the housing 42 is accommodated in the component mounting portion 22D. The frame 22 includes a first open portion 90A to accommodate the bicycle component 40 in the frame 22. The first open portion 90A is provided over the component mounting portion 22D, the portion of the seat tube 22E connected to the component mounting portion 22D, and the portion of the down tube 22C connected to the component mounting portion 22D. The first open portion 90A is open toward the front and upper sides of the bicycle 10. Preferably, a cover (not shown) is attached to the first open portion 90A. The cover closes the opening of the first open portion 90A.

At least part of the bicycle component 40 is arranged inside the frame 22. At least part of the bicycle component 40 in accordance with the present embodiment is arranged inside the seat tube 22E. More specifically, part of the first accommodation portion 56 is accommodated in the seat tube 22E, and the second accommodation portion 58 is accommodated in the component mounting portion 22D. Preferably, the outer circumference of the second accommodation portion 58 is provided with an electric terminal connected to the controller 52 (refer to FIG. 3). The electric terminal on the outer circumference of the second accommodation portion 58 is connected to the battery 18, which is located inside the down tube 22C. The housing 42 is mounted on the frame 22 so that the rotation axis of the motor 48 substantially extends in the longitudinal direction of the seat tube 22E.

Modifications

The description related with the above embodiment exemplifies, without any intention to limit, an applicable form of a bicycle component according to the present disclosure. In addition to the embodiments described above, the bicycle component according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiment. Such components will not be described in detail.

Figure 11:
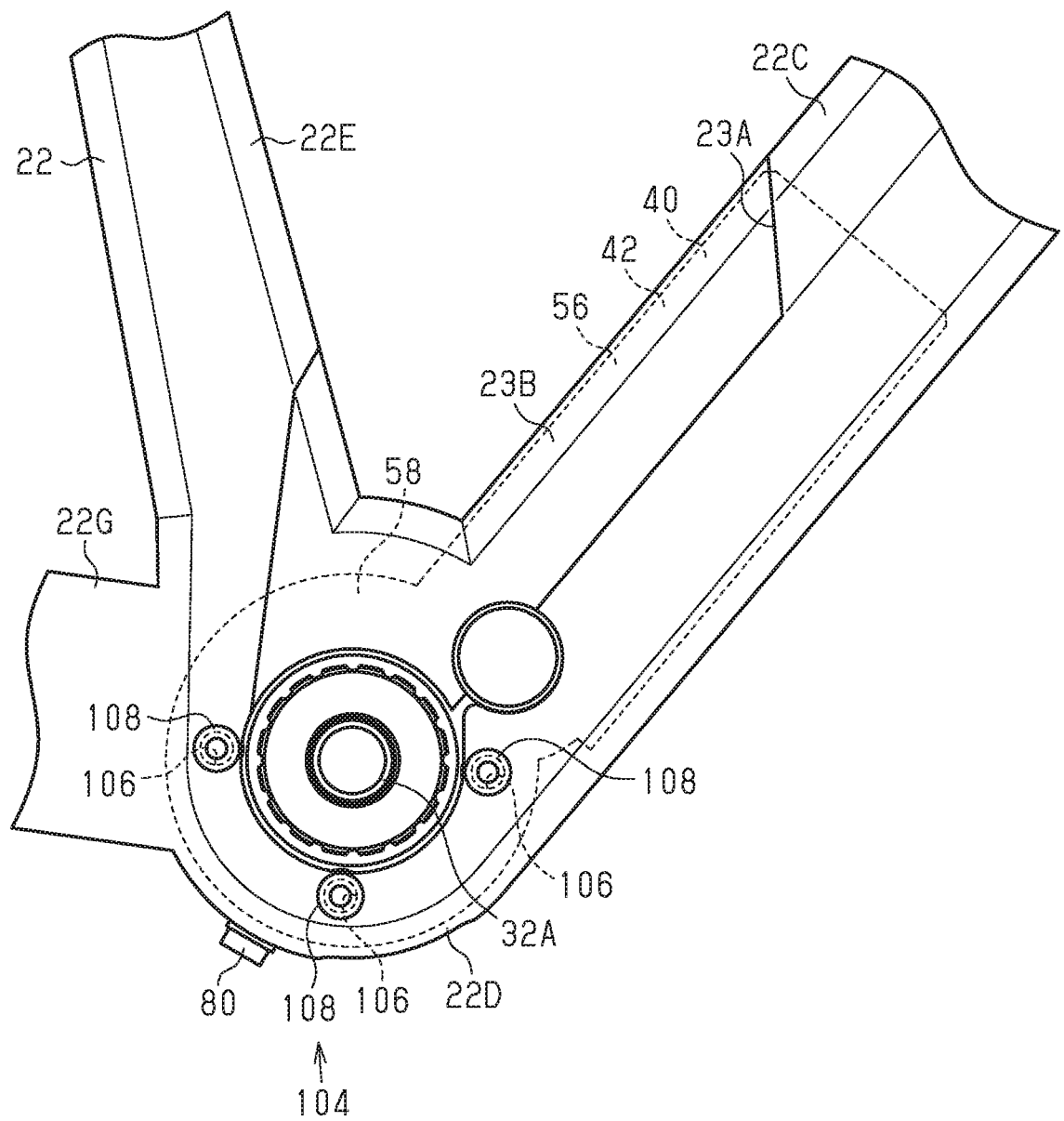
FIG. 11 is a right side elevational view of a portion in the vicinity of the crankshaft of a bicycle including a first modification of the bicycle component.

The second mounting portion 46 of the first and second embodiments can be changed to a second mounting portion 104 shown in FIG. 11. The second mounting portion 104 includes a plurality of threaded holes 106 and a plurality of the first coupling members 108. The threaded holes 106 are formed in the housing 42. The first coupling members 108 are bolts. The first coupling members 108 are extended through the frame 22 and coupled to the threaded holes 106. The first coupling members 108 include male threads joined with female threads of the threaded holes 106. The threaded holes 106 and the first coupling members 108 are arranged at intervals around the crankshaft 32A.

Figure 12:
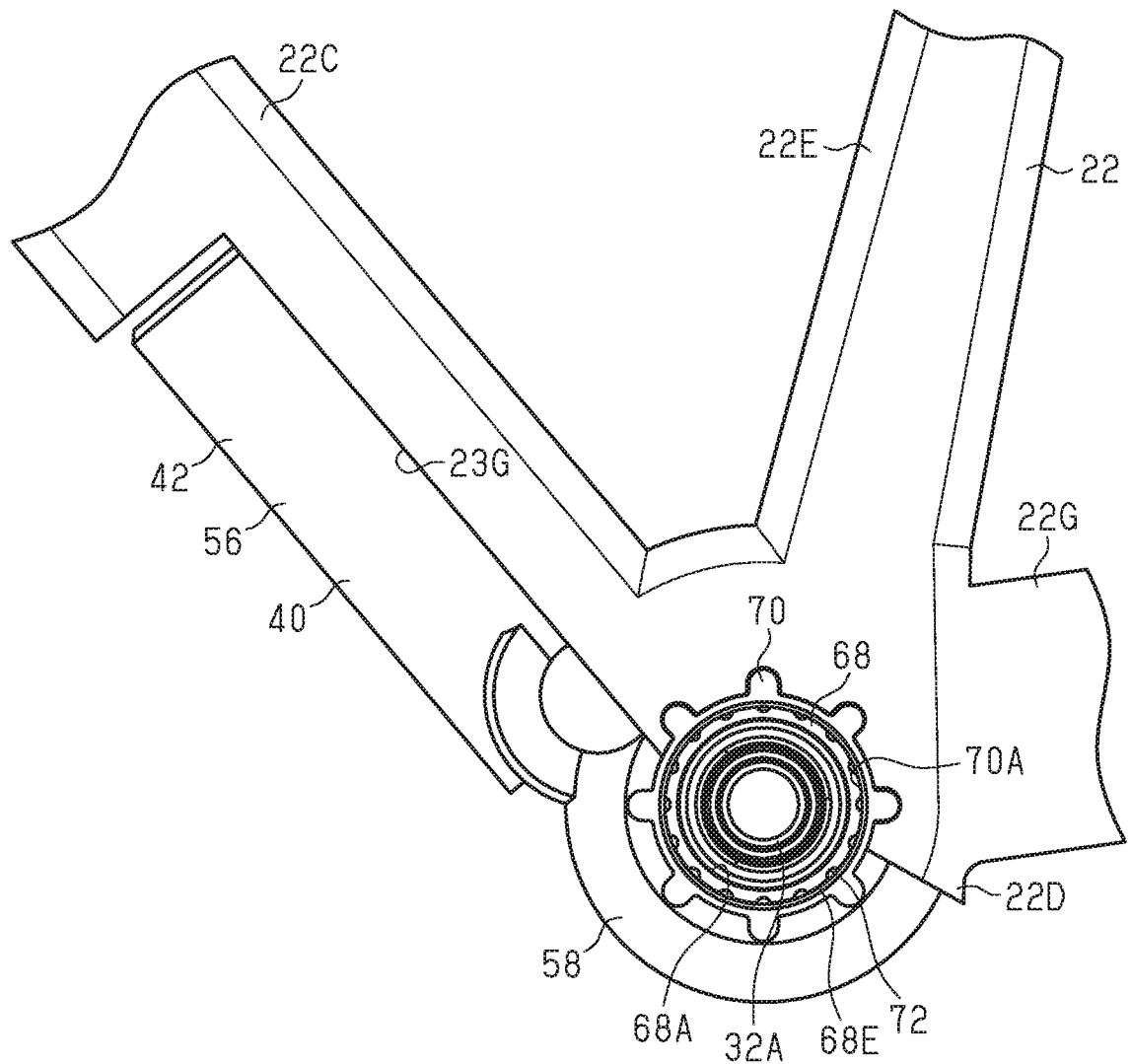
FIG. 12 is a left side elevational view of a portion in the vicinity of the crankshaft of a bicycle in a second modification.
Figure 13:
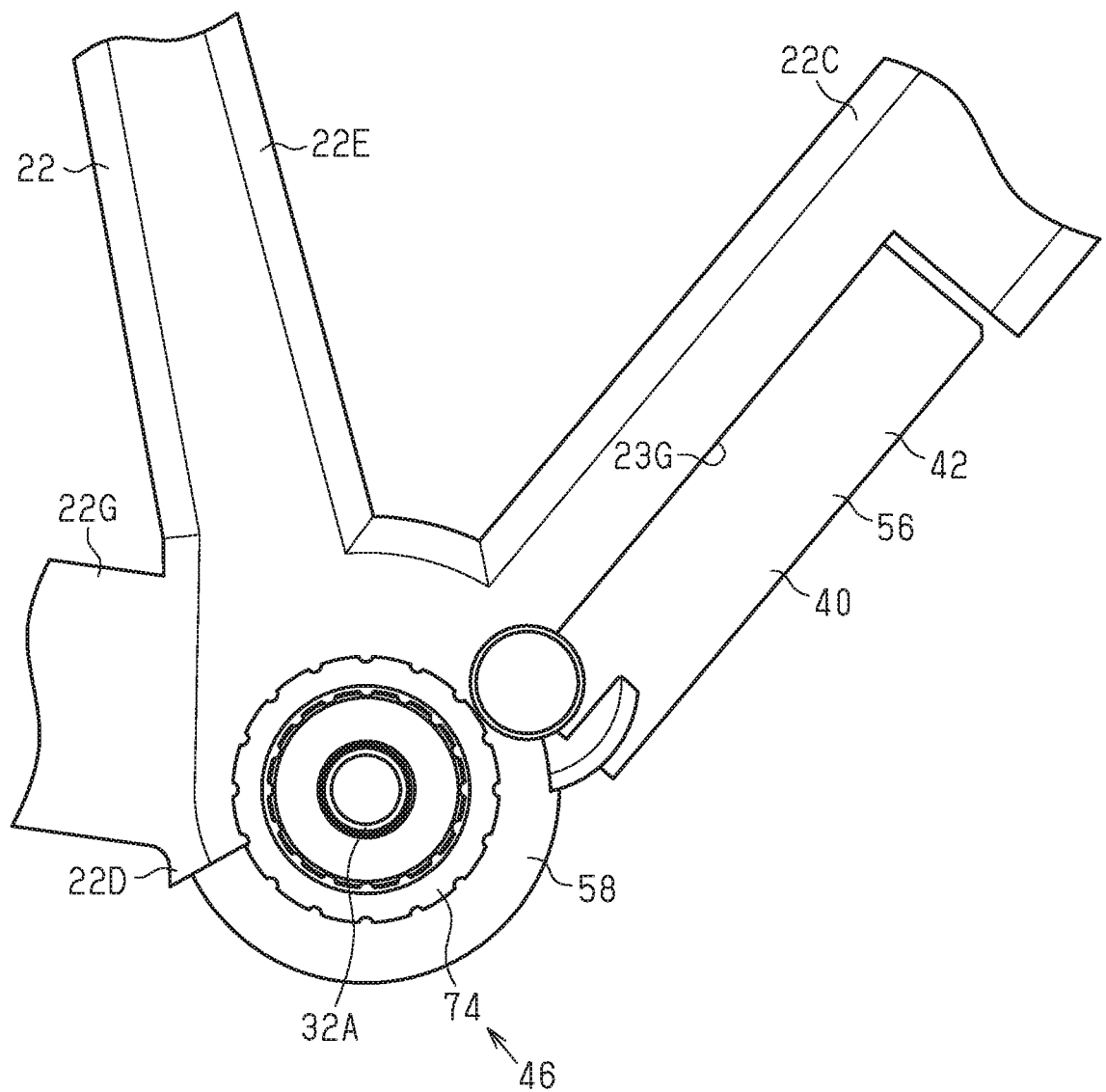
FIG. 13 is a right side elevational view of the portion in the vicinity of the crankshaft of the bicycle of FIG. 12.

As shown in FIGS. 12 and 13, in the first embodiment, instead of the first open portion 23A, the frame 22 can include a first open portion 23G that opens toward the lower side of the bicycle 10. The first open portion 23G is provided over the lower part of the component mounting portion 22D and the portion of the down tube 22C connected to the component mounting portion 22D. The bicycle component 40 is inserted into the opening of the first open portion 23G from the lower side and mounted on the frame 22. The opening of the first open portion 23G extends in the side walls 23D and 23E of the component mounting portion 22D from where the crankshaft 32A is provided. Preferably, a cover (not shown) is attached to the first open portion 23G.

Figure 14:
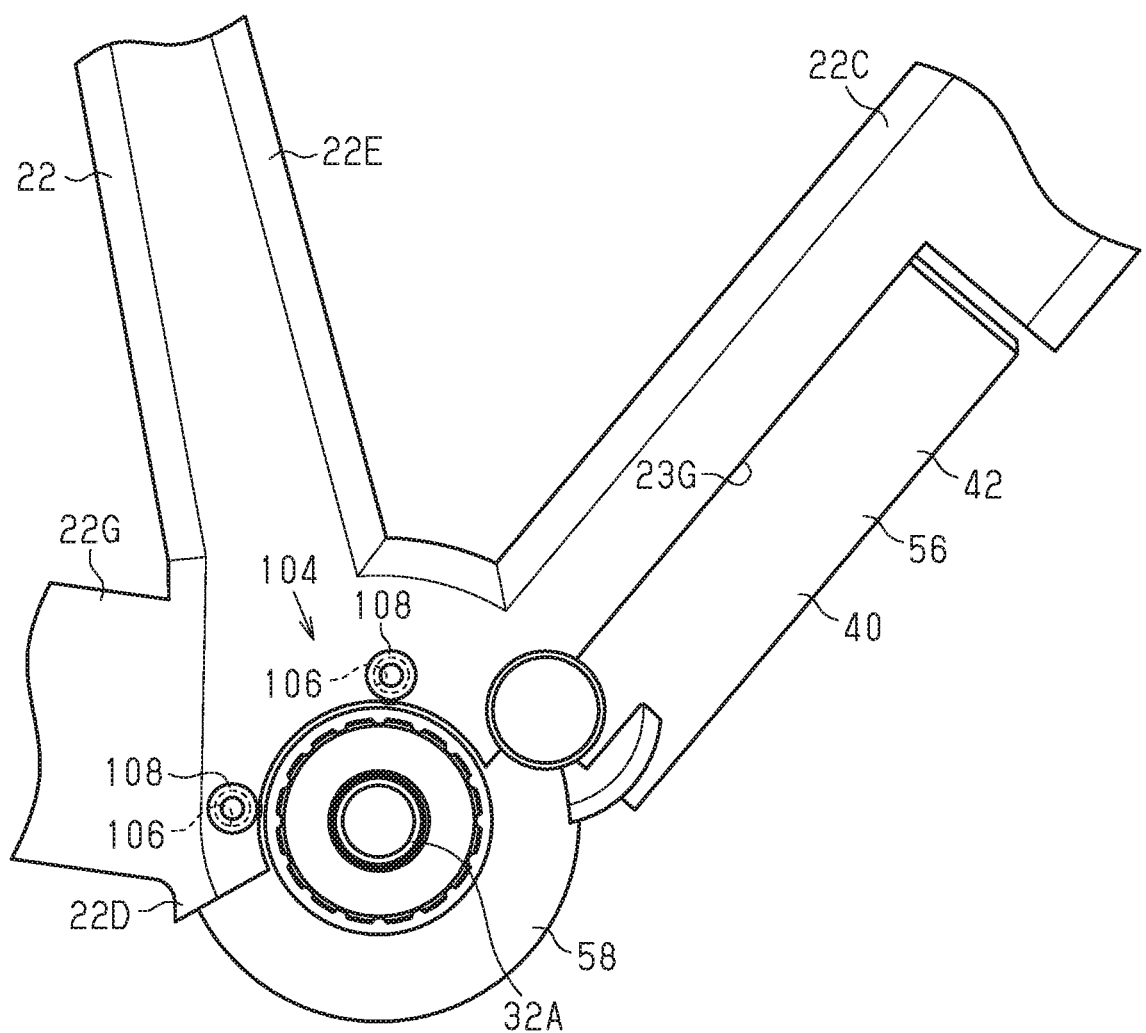
FIG. 14 is a right side elevational view of a portion in the vicinity of the crankshaft of a bicycle in a third modification.

As shown in FIG. 14, in the modification of FIGS. 12 and 13, the first coupling member 74 can be replaced by the first coupling members 108. In the modification shown in FIG. 14, the first mounting portion 44 can be modified to have the same structure as the second mounting portion 46.

In the first embodiment, the second embodiment, and the modification of the first embodiment shown in FIGS. 12 and 13, the second mounting portion 46 can be modified to have the same structure as the first mounting portion 44.

In the first embodiment, the second embodiment, and the modification of the first embodiment shown in FIGS. 12 and 13, the first mounting portion 44 can be modified to have the same structure as the second mounting portion 46.

In the first embodiment, the second embodiment, and the modification of the first embodiment shown in FIGS. 12 and 13, the first mounting portion 44 can be replaced by the second mounting portion 104 shown in FIG. 11.

In the first embodiment, the second embodiment, and their modifications, the first coupling member 74 can be shaped to have the form of a non-continuous ring. For example, the first coupling member 74 can be C-shaped.

In the first embodiment, the second embodiment, and their modifications, at least one of the first member 68 or the second member 70, or both can be shaped to have the form of a non-continuous ring. For example, the first member 68 and the second member 70 can be C-shaped. In the first embodiment, the second embodiment, and their modifications, the projections 70F can be omitted from the second member 70. In this case, the recesses 22X can be omitted from the frame 22.

A transmission can be provided in the housing 42 of the bicycle component 40 in lieu of or in addition to the motor 48. In this case, the housing 42 can accommodate at least part of the transmission. The transmission changes the speed of the rotation input to the crankshaft 32A and outputs the rotation to the front rotation body 36.

In each of the embodiments and modifications, the locations of the first mounting portion 44 and the second mounting portions 46 and 104 can be changed. For example, the first mounting portion 44 can be located in the housing 42 at the side of the second side surface 42Y, and the second mounting portions 46 and 104 can be located in the housing 42 at the side of the first side surface 42X.

In each of the embodiments and the modifications, a structure similar to that of the first mounting portion 44 can be provided at the side of the second side surface 42Y. In this case, the second mounting portions 46 and 104 can be omitted.

In each of the embodiments and the modifications, the first mounting portion 44 can be modified to a structure similar to that of the second mounting portion 46. For example, a first mounting portion 110 shown in FIG. 15 is configured to sandwich the frame 22 with the housing 42 in the axial direction C of the crankshaft 32A. The first mounting portion 110 includes a first part 112 and a second part 114. The housing 42 includes a female thread 42C. The first part 112 is configured to be joined with the housing 42. The first part 112 has an inner circumferential surface that defines a through hole 112A and an outer circumferential surface that includes a male thread 112B joined with the female thread 42C. The second part 114 extends outward in the radial direction of the crankshaft 32A from the first part 112 and is configured to press the frame 22. The first mounting portion 110 further includes a tool engagement portion 116 that is engageable with a tool. The tool engagement portion 116 is defined by, for example at least one of the inner circumference of the first part 112 or the outer circumference of the second part 114, or both.

The modification of FIG. 15 can be modified as shown in FIG. 16. In FIG. 16, a first mounting portion 110A includes a first part 118. The first part 118 includes a female thread 118B joined with a male thread 42D of the first part 118. The first mounting portion 110A is configured to sandwich the frame 22 with the housing 42 in the axial direction C of the crankshaft 32A. The first mounting portion 110A includes the first part 118 and the second part 114. The housing 42 includes the male thread 42D. The first part 118 is configured to be joined with the housing 42. The first part 118 includes an inner circumferential surface, which defines a through hole, and an outer circumferential surface. The inner circumferential surface defining the through hole includes a female thread 182B joined with the male thread 42D.

What is claimed is:

1. A bicycle component comprising:
a housing including a support that supports a crankshaft of a bicycle;
a first mounting portion provided on the housing independently from the support to mount the housing on a frame of the bicycle; and
a second mounting portion configured to mount the housing on the frame of the bicycle,
the first mounting portion including a through hole through which the crankshaft extends,
the first mounting portion being provided on a first side portion of the housing in an axial direction of the crankshaft, and
the second mounting portion being provided on a second side portion of the housing at an opposite side of the first side portion in the axial direction of the crankshaft.

2. The bicycle component according to claim 1, wherein the first mounting portion includes
a first member including a male thread and configured to press the housing, and
a second member including a female thread joined with the male thread of the first member and configured to press the frame.

3. The bicycle component according to claim 2, wherein the first member is configured so that a first end surface in an axial direction of the crankshaft presses the housing.

4. The bicycle component according to claim 2, wherein the first member is configured to support the housing in a direction intersecting an axial direction of the crankshaft.

5. The bicycle component according to claim 4, wherein the first member includes the through hole, and
the housing includes an insertion portion inserted into the through hole of the first member.

6. The bicycle component according to claim 2, wherein at least part of the second member is provided between the housing and the frame.

7. The bicycle component according to claim 2, wherein at least part of the second member is provided between the first member and the frame.

8. The bicycle component according to claim 2, wherein the second member is configured to contact a part of the frame in a direction intersecting an axial direction of the crankshaft.

9. The bicycle component according to claim 2, wherein at least one of the first member or the second member, or both further includes a tool engagement portion that is engageable with a tool.

10. The bicycle component according to claim 9, wherein the tool engagement portion is defined by at least one of an inner circumferential portion or an outer circumferential portion of the first member, or both.

11. The bicycle component according to claim 1, wherein the first mounting portion is configured to sandwich the frame with the housing in an axial direction of the crankshaft.

12. The bicycle component according to claim 11, wherein the first mounting portion further includes a tool engagement portion that is engageable with a tool.

13. The bicycle component according to claim 1, wherein the first mounting portion includes
a first part configured to be joined with the housing, and
a second part extending outward in a radial direction of the crankshaft from the first part and configured to press the frame.

14. The bicycle component according to claim 13, wherein
the housing includes a female thread, and
the first part has an inner circumferential surface that defines the through hole and an outer circumferential surface that includes a male thread joined with the female thread.

15. The bicycle component according to claim 13, wherein
the housing includes a male thread, and
the first mounting portion has an inner circumferential surface including a female thread joined with the male thread.

16. The bicycle component according to claim 1, wherein the second mounting portion includes
a threaded hole formed in the housing, and
a first coupling member extended through the frame and coupled to the threaded hole.

17. The bicycle component according to claim 16, wherein
the second mounting member includes a plurality of threaded holes and a plurality of first coupling members, and the threaded holes and the first coupling members are arranged at intervals around the crankshaft.

18. The bicycle component according to claim 1, further comprising
a third mounting portion configured to mount the housing on the frame of the bicycle, the third mounting portion being provided on the housing in a direction intersecting an axial direction of the crankshaft.

19. The bicycle component according to claim 18, wherein
the third mounting portion includes
a threaded hole formed in the housing, and
a second coupling member extended through the frame and coupled to the threaded hole.

20. The bicycle component according to claim 1, further comprising
a motor provided on the housing, the motor being configured to assist in propulsion of the bicycle.

21. The bicycle component according to claim 1, wherein the housing is configured to be at least partially accommodated in the frame.

22. A bicycle component comprising:
a housing including a support that supports a crankshaft of a bicycle; and
a first mounting portion provided on the housing independently from the support to mount the housing on a frame of the bicycle,
the first mounting portion including a through hole through which the crankshaft extends, and
the first mounting portion being configured to apply force to the housing and the frame acting to move the housing and the frame away from each other in an axial direction of the crankshaft.

* * * * *